United States Patent [19]

Braun

[11] Patent Number: 5,273,154
[45] Date of Patent: Dec. 28, 1993

[54] DISPLAY CUSHION, PROCESS FOR ITS MANUFACTURE AND DISPLAY

[76] Inventor: Reiner Braun, Vogelsangstrasse 41, 7540 Neuenbürg, Fed. Rep. of Germany

[21] Appl. No.: 76,950

[22] Filed: Jun. 15, 1993

Related U.S. Application Data

[63] Continuation of Ser. No. 778,095, Dec. 12, 1991.

[30] Foreign Application Priority Data

| Jun. 15, 1989 | [DE] | Fed. Rep. of Germany ... 8907306[U] |
| Jul. 22, 1989 | [DE] | Fed. Rep. of Germany ... 8908935[U] |
| Nov. 21, 1989 | [DE] | Fed. Rep. of Germany ....... 3938558 |
| Apr. 7, 1990 | [DE] | Fed. Rep. of Germany ... 9004078[U] |

[51] Int. Cl.⁵ .......................... B65D 81/16; A47S 3/14
[52] U.S. Cl. .................... 206/45.19; 206/561; 206/566; 206/495; 206/6.1; 428/160; 428/172; 264/321; 264/45.1
[58] Field of Search ........................ 428/160, 172, 315; 264/293, 321, 45.1; 206/45.14, 45.19, 6.1, 566, 460, 495, 561; 156/79

[56] References Cited

U.S. PATENT DOCUMENTS

| 1,980,776 | 11/1934 | Warner ............................ 206/566 X |
| 3,857,133 | 12/1974 | Linenfelser ..................... 428/160 X |
| 3,979,487 | 9/1976 | Squier et al. ..................... 428/160 X |
| 4,073,991 | 2/1978 | Focht .............................. 428/160 X |
| 4,273,820 | 6/1981 | Swietzer ......................... 428/160 X |
| 4,502,234 | 3/1985 | Schaefer et al. ................. 428/160 X |
| 4,810,558 | 3/1989 | Hornung et al. ................ 428/160 X |

Primary Examiner—Paul T. Sewell
Assistant Examiner—Jacob K. Ackun, Jr.
Attorney, Agent, or Firm—Nikaido, Marmelstein, Murray & Oram

[57] ABSTRACT

Display cushion (1), especially for pieces of jewellery, with a cushion layer (3) of foamed material.

A novel jewellery display cushion, which can be simply and inexpensively manufactured but nevertheless fully meets the high aesthetic requirements of the jewellery trade and presents additional handling advantages, is made available by the fact that the cushion layer (3) consists of a thermoplastic plastic material and is hot-formed to produce a moulding corresponding to the shape of the cushion.

A process for manufacturing such jewellery cushions is also the subject of the invention.

21 Claims, 4 Drawing Sheets

DISPLAY CUSHION, PROCESS FOR ITS MANUFACTURE AND DISPLAY

This application is a continuation of application Ser. No. 07/778,095 filed Dec. 12, 1991.

The invention relates to a display cushion with a cushioning layer of elastic foamed material and to a method for manufacturing such cushions.

Display cushions serve as a support for objects for display in appropriate containers. They usually have a rectangular base area and are produced in a number of different sizes according to the objects to be displayed. The cushions are often used in conjunction with display trays.

Display trays are used to display the objects for display in a visually attractive way. For instance, in jewellers' shops, jewellery cabinets with a large number of removable trays are used. Display trays are often specifically adapted to transportable sample cases for commercial travellers. Such a sample case also contains a large number of trays.

Each display tray usually has a display surface which is surrounded by a thickened edging.

The objects for display are each fixed on a display cushion and laid out on the display surface in suitable compartments divided by crosspieces. When the display tray and the display cushion are offered as parts which are separate but matched to each other and used together, they are also referred to as a display set, the two elements being in a functional relationship to each other. The present invention also relates to such a display set.

The invention is intended in particular for the displaying of jewellery, including watches. It can furthermore be advantageously used for other objects for display in connection with which there are similar requirements. In the following text, reference is made, by way of example and without restriction of generality, to jewellery display trays (in short: jewellery trays) and jewellery display cushions (in short: jewellery cushions).

The known jewellery cushions are largely manufactured by hand. The foamed material is placed on or cemented to a rigid base part, which is covered by an appropriately cut piece of fabric which is somewhat larger in all directions than the jewellery cushion. The extra length of the fabric is pulled round the side edges and cemented under the rigid base part or between the latter and the foamed material. The shape of the jewellery cushion is determined by the rigid base part. For flat simple cushions a small flat piece of cardboard is usually used as the base. For complicated plastic shapes such as are customary for the displaying of necklaces or earrings it is necessary to have appropriately shaped basic bodies which are usually made, largely by hand, of wood or a rigid plastic material.

This demanding method of manufacture is considered to be necessary in the trade in order to ensure the attractive appearance of the jewellery cushion, which is extraordinarily important in the display of jewellery.

British Patent Specification 1 047 671 discloses a method of manufacturing a jewellery cushion which is intended to reduce the expense of the previously known manual method of production. In this process, a pressure-sensitive adhesive is applied to the edge region of a rigid supporting part, the cushion layer is laid on the middle, adhesive-free section of the supporting part, both are covered with the textile covering layer and the latter is pressed against the adhesive-covered edge in order to establish a bond between the covering layer and the supporting part and to enclose the cushion layer between these two layers. Although this admittedly simplifies manufacture, the product, because of its flat uncushioned edge, in no way satisfies the aesthetic demands of the jewellery trade. The weight is if anything even greater than that of the known jewellery cushions.

In order to make available display cushions which can be manufactured in a considerably simpler way without impairment of the display function, which permit simple handling and are distinguished by being particularly light, it is proposed, in connection with a jewellery cushion of the type described at the beginning, that the cushion layer should consist of a thermally deformable plastic material and should be thermally moulded to form a moulded body corresponding to the shape of the cushion.

Owing to the considerable reduction in weight, the invention is particularly suitable, above all, for objects for display which are to be transported in fairly large quantities with corresponding display sets and in the case of which the weight of the display objects themselves constitutes a relatively small proportion (less than half) of the weight of conventional display sets.

The method of manufacture of such display cushions according to the invention is distinguished by the fact that the thermally deformable plastic material is heated, plastically deformed by the application of pressure and cooled down with maintenance of the deformation.

The thermal deformation of foamed materials or of laminates thereof with other materials is known in principle from other fields of application (U.S. Application No. 3,170,832). For instance, mouldings for packaging purposes (DE-U1-86 21 237) and cushioning parts for furniture and articles of clothing are made in this way. The thermally deformable foamed material is heated to a temperature which is above the softening temperature but below the melting range. After that the desired shape is imparted to it, preferably with the aid of an appropriate mould. Such a thermally-deformed foamed plastic article is recognisable by the fact that the foamed material displays regions of different density or porosity depending on how strongly it was compressed during the deforming process.

The display cushions according to the invention are easy to handle and durable. The plastic shape imparted is largely determined by the thermal deformation. It is no longer necessary to have a shape-determining rigid base section as in the case of the jewellery cushions previously known. A particular advantage is the extraordinarily light weight (about a third of that of the known cushions) made possible thereby.

Surprisingly, an aesthetically extraordinarily attractive shape is nevertheless achieved. Furthermore, the cushions are pleasantly soft and have a good feel. Items of jewellery can be fixed to the cushions with pins easily and more reliably than hitherto.

These advantages apply in particular to preferred examples of embodiment, for which the features described hereafter and characterized in the subclaims can be used both individually and in combination with each other.

The cushion layer consists preferably of a highly crosslinked foamed material, especially one based on polyethylene or a polyethylene copolymer. A foamed material made by physical foaming of an extruded plastic material with the aid of an inert gas has proved especially suitable. Such a material is sold by the firm BXL Plastics Limited under the brand names "Plastazote" and "Ivazote".

The density of the foamed material should be between 15 and 130, and preferably between 20 and 70 kg/m$^3$.

The top surface of the cushion layer can—as in the case of the known jewellery cushions—be covered with a covering layer of textile material. Surprisingly, however, it has also been found that an attractive external appearance can also be achieved when such a covering layer is dispensed with and the surface of the cushion layer is therefore visible. In this case it is advantageous to provide the top surface with a fine-structured embossed pattern. This is preferably done with the aid of a "nylon print process". In this the desired fine structure, which simulates to advantage a velvet-like textile texture or a leather embossed pattern, is transferred photographically to a nylon film, which is inserted into the embossing mould during the hot forming of the jewellery cushion.

A further preferred embodiment provides for direct covering of the cushions with flocking. In this case the heat forming is done by drawing in order to avoid damaging the flocked surface.

Where a covering layer (skin) of textile material is used, this is done by bonding the skin to the cushion layer to form a layered composite structure, which is longer separable without destruction, and this structure as a whole is thermally moulded to produce the jewellery cushion. In this connection it is important that a textile material which is elastic in both surface directions should be used. The elasticity can be created by the nature of the composite textile structure. For this, a knitted fabric is found to be particularly suitable. It is also possible, however, to use an appropriately elastic yarn material (made, for instance, from an elastomer). The elasticity must be great enough for an aesthetically attractive shape to be achieved —especially in the case of the jewellery cushions in the form of rectangular panels, at most only 4 to 6 mm thick, such as are used for pendants and chains—without troublesome curving of the cushion. The material should preferably be stretchable in both surface directions by at least 10%.

Problems with regard to the display effect may be created by the fact that precisely such highly elastic materials as are especially preferred for the invention are often thin and visually unattractive. Specially preferred, therefore, is a skin consisting of a two-layer material, with the lower layer which faces towards the cushion layer consisting of a basic material (knitted fabric or elastomer) which is highly elastic in both surface directions, while the upper layer is visually so dense that the lower layer is not visible. High elasticity and an appearance which meets the requirements of the jewellery trade are thereby combined in an ideal manner.

The composite layered structure consisting of the skin and the cushion layer cannot be separated without damage. Preferably the two layers are bonded together over the entire surface, it being expedient to produce the laminate by cementing.

A suitable adhesive is, for instance, a fusion adhesive or contact adhesive.

The temperature of the composite layered structure during the embossing process should preferably be above 140° C. The material of the adhesive layer must of course also be adapted to this temperature. If a contact adhesive is used, it must be sufficiently temperature-resistant not to decompose during the heating. A certain softening of the adhesive through the heating is, on the other hand, harmless. In the case of the composite layered structure, particularly good bonding of the layers to each other can indeed be achieved by the application of heat and pressure during the thermal moulding.

The moulding of the heat-formable foamed material to produce the jewellery cushion is preferably done by embossing. The foamed material or composite layered structure with the textile skin can be laid on a flat surface and formed with a single-part matrix. If a certain profile is also to be imparted to the underside, a two-part matrix is used, the two matrix-halves being plastically shaped three-dimensionally and the lower matrix-half determining the shape of the underside of the jewellery cushion while that of the upper side of the jewellery cushion is determined by the upper matrix-half. At least one of the matrix-halves should contain ventilation channels. This method makes it possible to produce completely novel shapes of jewellery cushions, especially in the case of earring cushions.

As mentioned, the shape imparted must be retained during the cooling of the foamed material or composite layered structure. It is expedient to cool down the matrix to a temperature below the softening temperature of the thermoplastic foamed material This enables rapid and accurate "freezing" of the shape to be achieved.

Following the second step in the process, the embossed jewellery cushions can be stamped out with a sharp-edged stamping tool in order to produce a clean edge. The dimensional accuracy thus achieved meets stringent requirements.

The cushion layer is preferably formed in the region of the edge of the cushion in such a way that the thickness of the layer decreases continuously towards the edging, the upper side of the cushion layer being curved downwards in a convex shape. When a cushion layer thus shaped is produced from a thermally formable material, this material is strongly compressed and thus strengthened at the edge. The edge terminates in a narrow, sharp line which is easy to take hold of and gives the cushion very good handling properties. In addition, this shaping is particularly advantageous in connection with the jewellery display set described below.

In a jewellery display set according to the invention, the jewellery tray and especially its tray surface, which is divided by crosspieces into a plurality of compartments, and the jewellery cushion are matched to each other in a special way. In this connection the previously described jewellery cushions used are preferably, but not necessarily, made of hot-formed foamed material.

The matching to each other of the jewellery cushion and tray comprises two groups of measures.

Firstly, the surface dimensions of the jewellery display cushions are somewhat larger than the corresponding surface dimensions of the compartments. The jewellery cushions are slightly elastically compressible in the direction parallel to their surface towards their centre. This causes the edges of the jewellery cushion to press in each case against the inner limiting walls of the crosspieces facing towards the cushion.

Secondly, through special shaping of the limiting walls of the crosspieces facing towards the jewellery cushions, firm fitting of the jewellery cushions in the compartments is ensured. This can be achieved by the crosspieces having a cross-section which increases from the tray surface upwards, so that their limiting walls facing towards the compartments are inclined inwards. Alternatively or additionally, the limiting walls can have an adhesion-increasing covering, especially a "flocking".

In a jewellery display set so constructed the cushions fit into the compartments so firmly that they cannot fall out during transportation of the display set. This applies even when pieces of jewellery are attached to them and the jewellery tray with the jewellery cushions and the pieces of jewellery is placed vertically or even turned upside down. This represents a particularly valuable handling advantage, especially for commercial travellers in the jewellery trade. A particularly advantageous feature in this connection is that many pieces of jewellery can be securely fixed in the cushions according to the invention merely by sticking in a pin, whereas they often had to be sewn to the known jewellery cushions.

The invention will now be explained in greater detail with reference to an example of embodiment shown schematically in the figures.

Figure 1:
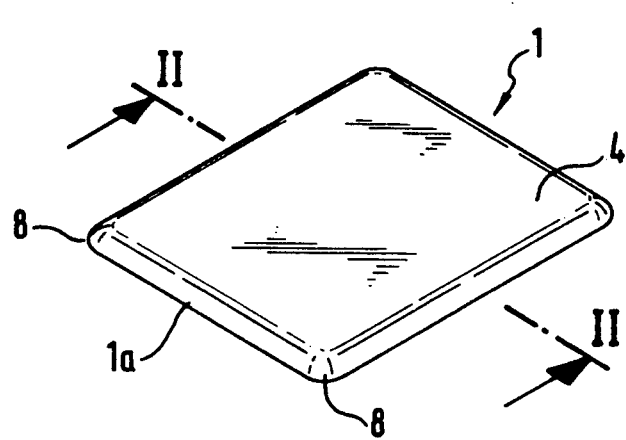
FIG. 1 shows a jewellery cushion according to the invention in perspective view.
Figure 2:
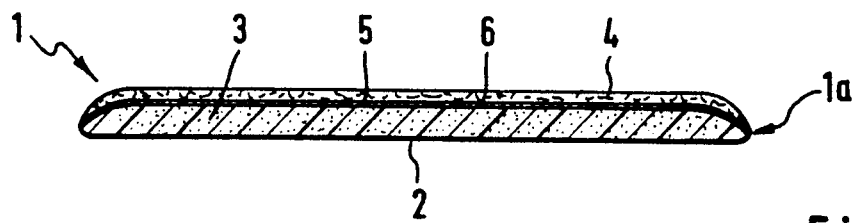
FIG. 2 shows a section along the line II—II in FIG. 1.
Figure 3:
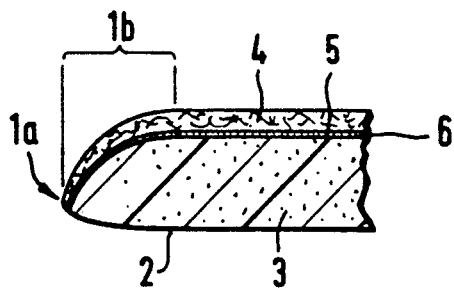
FIG. 3 shows a detail representation from FIG. 2.

FIGS. 1 to 3 show a simple flat jewellery cushion 1. It consists of a cushion layer 3 facing towards the underside 2 and a skin 4 covering the upper side 5. They are bonded together by an adhesive layer 6.

Details can be seen more clearly in FIG. 3. In the edge area of the jewellery cushion 1 designated 1b the thickness of the cushion layer 3 decreases continuously towards the edging 1a. This is predominantly brought about not by the stresses in the layers but by the plastic deformation of the layer of foamed material during the production process described above. In this, as shown, the upper side of the cushion layer and the adhesive layer are bent downwards in a convex shape. On the other hand, the underside 2 of the cushion layer 3 runs largely flat as far as the edging 1a. Only immediately before the edge Ia does a slight upward curvature occur. This does not, however, affect the appearance and practical use of the jewellery cushion 1. On the contrary, the slight arching facilitates the removal of the jewellery cushion from a corresponding jewellery tray without, on the other hand, impairing the flat lay of the underside.

For durability and practical use it has proved advantageous if the corners 8 of the jewellery cushion are rounded with a relatively large radius of curvature. This should be at least 1 mm, while at least 2 mm is particularly preferable.

Figure 4:
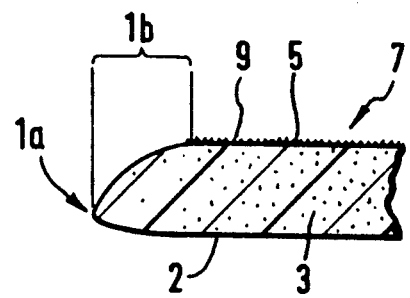
FIG. 4 shows a detail representation corresponding to FIG. 3 of an alternative embodiment.

FIG. 4 shows a sectional view of an embodiment of a jewellery cushion 7 in which the cushion layer 3 is not covered by a skin, so that its surface turned towards the upper side 5 is visible. It is preferably, as explained above, provided with a fine-structured embossed pattern 9. The edging 1a ends in a point. Through the high compression during the embossing process the foamed material is strengthened here, thereby improving the handling properties (without impairing the aesthetic appearance). The strengthening is primarily due to the fact that the pores of the foamed material are closed (fused) in the outermost edge area through the effect of pressure and temperature.

Figure 5:
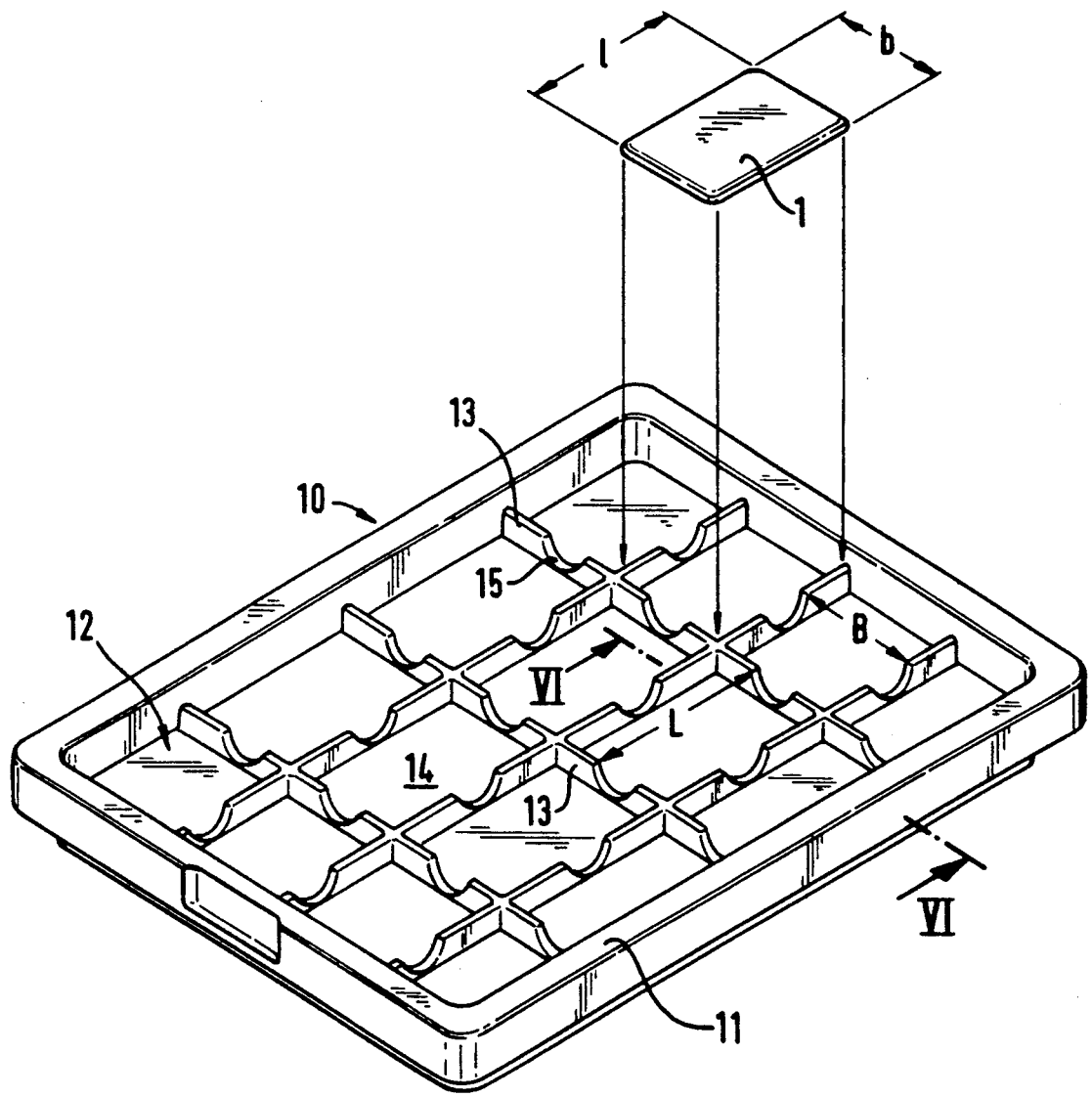
FIG. 5 shows a perspective view of a display set.

The jewellery display set shown in FIG. 5 consists of a jewellery tray 10 and jewellery cushions 1, of which only one is shown.

The jewellery tray 10 has a tray surface 12 surrounded by an edging 11, said surface being divided up into a plurality of compartments 14 by raised crosspieces 13.

The jewellery cushions 1, thanks to their easily grippable edging 1a, can be particularly easily inserted into and removed from the tray 10. Any special removing aid, especially an appropriate loop, can be completely dispensed with. Instead of this, the crosspieces 13 of the jewellery tray have gripping apertures 15 which preferably run down as far as the level of the tray surface 12 (bottom surface of the compartments 14).

Figure 6:
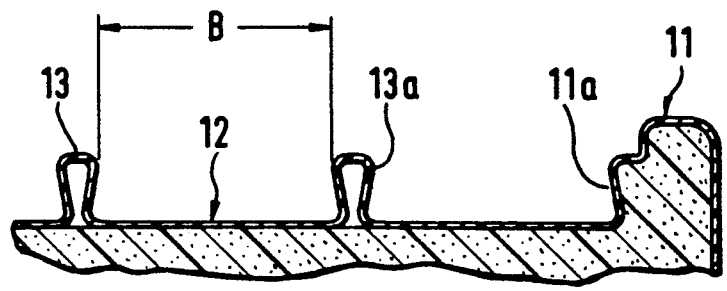
FIG. 6 shows a section along the line VI—VI in FIG. 5.

Preferably the crosspieces 13 of the compartments 14 have a cross-section which increases from the tray surface 12 upwards, as is shown in an exaggerated manner in FIG. 6. The inner sides 11a of the edging 11 of the tray are also correspondingly shaped. The width B and the length L of the compartments 14 at the height of the largest cross-section 13a of the crosspieces 13 is slightly (preferably approx. 0.5 to 1.5 mm) smaller than the maximum distance in height of the smallest crosspiece cross-section in the vicinity of the bottom surface 12. The associated jewellery cushions 1, specially matched to such a tray, are elastically deformable not only perpendicularly to their upper surface but also in the surface direction (that is, in the direction towards the edging 1a). It is expedient for their dimensions (length 1 and width b) in the surface direction in the uncompressed initial state to be slightly (preferably 0.2 to 0.5 mm) greater than the length and width of the compartments 14 at the height of the largest crosspiece cross-section 13a. This causes jewellery cushions 1 inserted into the compartments 14 to fit tightly with an elastic press fit so that, as mentioned earlier, they cannot fall out when the display set 1, 10 is being transported.

Figure 7:
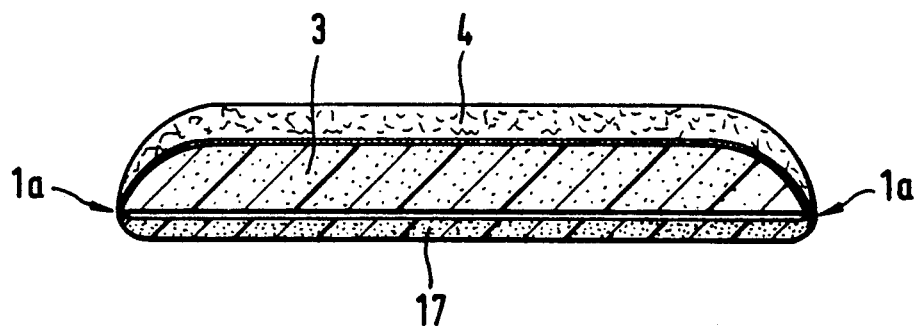
FIG. 7 shows a sectional representation of an alternative embodiment.
Figure 8:
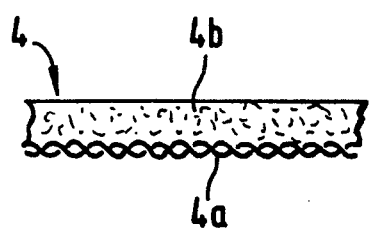
FIG. 8 shows a sectional representation of a double-layered skin.

FIG. 7 shows an embodiment of the jewellery cushion with an additional under-layer 17, which consists of a foamed material which has a higher density than the foamed material of the cushion layer. A density of between 50 and 130 kg/m$^3$ is preferred. The cushion layer 3 is not bonded to the bottom layer 17. On the contrary, the connection between the two layers is established only by the fact that they adhere to each other at the edging 1a during the hot forming. Surprisingly, this bonding is sufficiently durable without any additional measures. The additional bottom layer 17 made of a foamed material of higher density increases the rigidity of the jewellery cushion so much that even relatively large flat jewellery cushions with a longitudinal dimension of more than 8 cm can be made so as to be sufficiently rigid and light. FIG. 8 illustrates the preferred two-layer construction of the skin 4 consisting of a lower layer 4a which is highly elastic in both surface directions and preferably knitted and a visually non-transparent upper layer 4b. The upper layer 4b is preferably a flocking.

Figure 9:
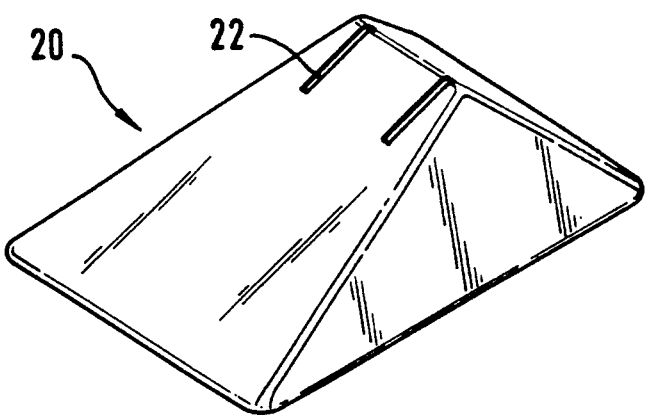
FIG. 9 shows a perspective view of a jewellery cushion for earrings.
Figure 11:
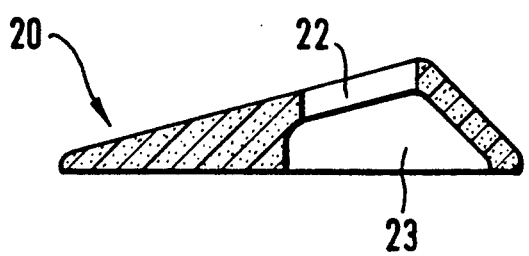
FIG. 11 shows a section along the line XI—XI in FIG. 10.
Figure 10:
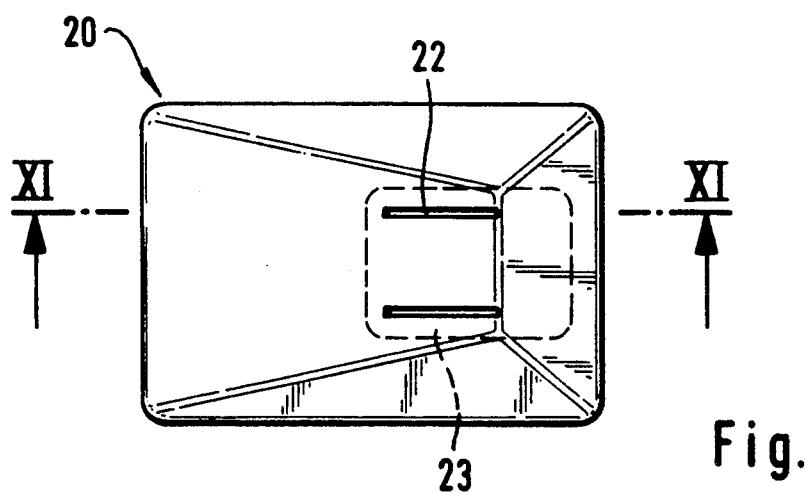
FIG. 10 shows a plan view of an earring cushion according to FIG. 9.

FIGS. 9 to 11 show an earring cushion 20 with a shape characteristic of such cushions with surfaces which run obliquely towards each other. It will be seen that even relatively complicated shapes with great variations in thickness can be made. Preferably, simple slits 22, which can be cut simultaneously when the jewellery cushions are stamped out, retain the earrings.

For the production of heavily profiled jewellery cushions with large differences in thickness it is expedient to use embossing matrices whose underside runs substantially parallel to their upper side. This results in the production of jewellery cushions with a cavity 23 on the underside, which cavity, in the case illustrated, serves to accommodate the attaching part of the earrings. Surprisingly, it is found that when the dimensions are relatively small, as in the case of the earring cushions shown, the rigidity of the hot-formed cushion layer 3 is so great that no additional bottom layer needs to be used in the area of the cavity 23.

Such earring cushions are universally usable for a great variety of different earring designs, whereas the known earring cushions usually have to be specially matched to the mechanical construction of the earring in question.

Figure 12:
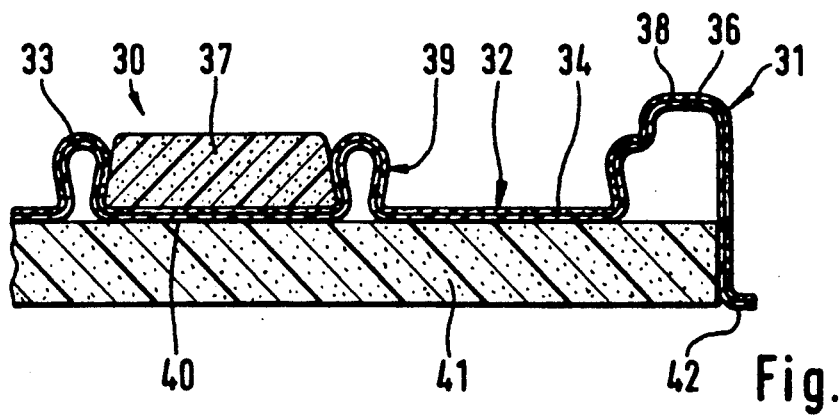
FIG. 12 shows a section through a further embodiment of a display set.

The display set shown in section in FIG. 12, consisting of a jewellery tray 30 and a jewellery cushion 37, is largely constructed in the same way as the set shown in FIGS. 5 and 6. It does, however, display some special features.

The tray surface 32 including the crosspieces 33, which divide up the compartments 34, is embossed into a sheeting body 36. The sheeting body 36 is the supporting element of the jewellery tray 30 and consists of a preferably drawn thermoplastic plastic material with a thickness of between about 0.6 mm and about 1 mm.

A press fit of the jewellery cushions 37 in the compartments 34 can be achieved by the shaping of the crosspieces 33 described in connection with FIG. 6. Preferably, instead of or in addition to the cross-section shape which is widened upwards, there is provided an adhesion-increasing coating 38 which covers at least the limiting walls 39 facing towards the compartments 34. It may consist, for instance, of a flocking or of a relatively rough-structured embossing of the surface of the sheeting body 36.

To the bottom surface 40 of the sheeting body 36 there is attached, preferably by cementing, a foamed plastic layer 41. Its thickness is preferably so dimensioned that it terminates flush with the lower limit 42 of the edging 31 or resiliently bends back slightly (by at most about 2 mm) in relation to the latter. The material of the plastic layer is relatively soft, in any case softer than the foamed material of the jewellery cushions 37.

This embodiment of the invention is particularly suitable for the packaging and transport of large quantities of pieces of jewellery. For this, hitherto, predominantly one or more pieces of jewellery were attached to jewellery cushions of the known kind and then packed and transported loose as a stack. This led to poor clarity of arrangement and impractical handling, but was considered necessary in order to enable many pieces of jewellery to be packed and transported in a small space.

With the embodiment of the invention described in connection with FIG. 12, substantially improved clarity of arrangement and handling are achieved without any increase in the production costs or the volume of packaging. The cushions 37 are preferably made only of hot-formable foamed material without a textile skin and are therefore particularly light and inexpensive. Thanks to a particularly fine-structured embossing it is possible to affix labels to identify the individual pieces of jewellery directly on the cushions 37 with ordinary labelling machines. The pieces of jewellery are easily and efficiently inserted into the jewellery cushions 37 already placed in the tray 30.

The overall height of the tray 30 including the cushions 37 is exaggerated in the figure. In practice it is expediently of the order of magnitude of about 1 cm, the height of the crosspieces being preferably about 3 to 4 mm. This flat construction results in a high density of packing of the pieces of jewellery. At the same time they are reliably held. If several jewellery display sets are stacked on top of each other, the pieces of jewellery press into the foamed plastic layer of the display set lying above them.

I claim:

1. A display compartment comprising;
a display cushion having a cushioning layer, said cushioning layer comprising
a hot-formable synthetic resin material, the cushioning layer being hot-formed to include a first region having a first density and a second region having a second density, wherein said first density is greater than said second density thereby imparting increased rigidity to the cushioning layer, wherein the second density is between 15 and 130 kg/$m^3$, and wherein the first region of the cushioning layer is disposed at an edge thereof, thereby imparting the increased rigidity to the edge of the cushioning layer, and wherein the cushioning layer is compressed at the edge to provide a cushion profile wherein the thickness decreases towards the edge of the hot formable synthetic material from a position towards a center thereof, with a top surface of the cushion layer being curved downwards in an edge region towards the edge in a convex shape, the edge region of the cushion being strengthened by the edge region being of said first density, and wherein an outer periphery of said display cushion defines a first surface area; said display compartment further comprising a plurality of compartment walls defining an inner periphery of said display compartment, said inner periphery defining a second surface area which is smaller than said first surface area when said cushion is out of said display compartment, wherein said display cushion is pressingly fit into said inner periphery defined by said plurality of compartment walls, such that said first surface area is compressed to be essentially equal to said second surface area.

2. The display compartment according to claim 1, wherein the synthetic resin material is at least one of a polyethylene and a polyethylene copolymer.

3. The display compartment according to claim 1, wherein a top surface of the cushioning layer is visible and is embossed.

4. The display compartment according to claim 1, wherein a top surface of the cushioning layer is flocked.

5. The display compartment according to claim 5, further comprising a textile material which covers at least a portion of a top of the cushioning layer, wherein the textile material is bonded with the cushioning layer to form a layered composite structure, and wherein the layered composite structure is hot-formed to form the display cushion.

6. The display compartment according to claim 5, wherein the textile material is a fabric which is elastic in all surface directions.

7. The display compartment according to claim 5, wherein the textile material is multi-layered with a bottom layer which is elastic in all surface directions and an upper layer which is optically dense such that the bottom layer is not visible when viewed from a top layer thereof.

8. The display compartment according to claim 5, wherein the textile material and the cushioning layer are secured together with an adhesive.

9. The display compartment according to claim 1, wherein the cushioning layer is multi-layered and has a bottom surface which comprises a first material which has a higher density than a second material, said second material forming a top surface of the cushioning layer.

10. A display compartment according to claim 1, wherein a cross section of each of said plurality of compartment walls is such that a surface area defined by said inner periphery of said compartment walls at a bottom thereof is greater than a surface area defined by an inner periphery of a top section of said compartment walls.

11. The display compartment according to claim 1 wherein said second density is between 15 and 70 kg/m$^3$.

12. A process for manufacturing a display compartment, comprising the steps of:
  (a) heating a hot-formable synthetic resin foam to a temperature which is above a softening temperature of the hot-formable synthetic resin foam;
  (b) compressing the hot-formable synthetic resin foam so as to form first regions and second regions, said first regions having a first density and said second regions having a second density, said first density being greater than said second density, said second density being between 15 and 130 kg/m$^3$,
  (c) cooling the foam while maintaining a compression pressure to retain the first regions of greater density; and
  (d) removing the compression pressure from the hot-formable synthetic resin foam to form a cushion having the first regions of greater density than said second regions, thereby increasing the rigidity of the cushion, wherein the hot-formable synthetic resin foam is compressed at an edge thereof to provide a cushion profile wherein a thickness decreases towards the edge of the hot-formable synthetic resin foam from a position towards a center thereof, with a top surface of the hot-formable synthetic resin foam being curved downwards in an edge region towards the edge in a convex shape and the edge region of the cushion being strengthened by the edge region being of said first density, wherein an outer periphery of said hot-formable synthetic resin foam defines a first surface area;
  providing a plurality of compartment walls disposed to define an inner periphery of said display compartment, said inner periphery defining a second surface area which is smaller than said first surface area when said cushion is out of said display compartment;
  inserting said cushion into said inner periphery of said display compartment, wherein said cushion is pressingly fit therein such that said outer periphery of said hot-formable synthetic resin foam is compressed to be within said inner periphery of the display compartment.

13. The process according to claim 12, wherein the step of compressing is performed with an embossing pattern.

14. The process according to claim 13, wherein the embossing pattern is a two-part embossing pattern with an upper and a lower side.

15. The process according to claim 12 wherein said second density is between 15 and 70 kg/m$^3$.

16. A display set comprising:
  a display tray with a tray surface;
  a plurality of crosspieces attached to the tray surface, each of said crosspieces having a width at a base region thereof which is less than a width at a top region thereof and the width of each crosspiece increases from the base region to the top region, wherein the plurality of crosspieces divided the tray surface into a plurality of compartments; and
  display cushions, each of said display cushions comprising a cushioning layer, said cushioning layer comprising a hot-formable synthetic resin material, said cushioning layer being hot-formed to include a first region having a first density and a second region having a second density, said second density being between 15 and 130 kg/m$^3$, wherein the first density is greater than the second density, and wherein the cushioning layer is compressed at an edge thereof to provide a cushion profile wherein a thickness decreases towards the edge of the hot-formable synthetic material from a position towards a center thereof, with a top surface of the cushion layer being curved downwards in an edge region towards the edge in a convex shape and the edge region of the cushion being strengthened by the edge region being of said first density, and wherein an outer periphery of said display cushion defines a first surface area,
  wherein each of said plurality of compartments has an inner periphery defining a second surface area which is smaller than said first surface area when the display cushions are out of the compartments wherein the display cushions are pressingly fit into the inner periphery of the compartments and the first surface area is compressed to be approximately equal to the second surface area.

17. The display set according to claim 16, wherein the display cushions are configured to have surface dimensions which are greater than corresponding surface dimensions of the compartments at the top region of the crosspieces.

18. The display set according to claim 16, wherein the display tray comprises a plastic sheeting body into which the tray surface including the plurality of crosspieces are embossed.

19. The display set according to claim 16 wherein said second density is between 15 and 70 kg/m$^3$.

20. A process for manufacturing a display compartment, comprising the steps of:
  providing a textile skin and a hot-formable synthetic resin foam;

bonding the textile skin to the hot-formable synthetic resin foam, thereby forming a layered composite structure;

heating the layered composite structure to a temperature which is above a softening temperature of the layered composite structure;

compressing the layered composite structure to form first regions and second regions, said first regions having a first density and said second regions having a second density, said first density being being greater than said second density, said second density being between 15 and 130 kg/m$^3$, cooling the layered composite structure while maintaining a compression pressure to retain the first regions of greater density; and removing the compression pressure form the layered composite structure to from a cushion having the first regions of greater density than said second regions, thereby increasing the rigidity of the cushion, wherein the hot-formable synthetic resin foam is compressed at an edge thereof to provide a cushion profile wherein a thickness decreases towards the edge of the hot-formable synthetic resin foam from a position towards a center thereof, with a top surface of the hot-formable synthetic resin foam being curved downwards in an edge region towards the edge in a convex shape, and the edge region of the cushion being strengthened by the edge region being of said first density, and wherein an outer periphery of said hot-formable synthetic resin foam defines a first surface area;

providing a plurality of compartment walls disposed to define an inner periphery of said display compartment, said inner periphery having a second surface area which is smaller than said first surface area, when said cushion is out of said display compartment;

inserting said cushion into said inner periphery of said display compartment, wherein said cushion is pressingly fit therein and wherein said first surface area is compressed to be approximately equal to said second surface area.

21. The process as recited in claim 20 wherein said second density is between 15 and 70 kg/m$^3$.

* * * * *